United States Patent
Kummer

(10) Patent No.: US 9,083,914 B2
(45) Date of Patent: Jul. 14, 2015

(54) ELECTRONIC SYSTEM INFORMING A FIRST ELECTRONIC DEVICE OF USER REMOTE CONTROL ACTIVITY INVOLVING A SECOND ELECTRONIC DEVICE

(75) Inventor: David A. Kummer, Highlands Ranch, CO (US)

(73) Assignee: ECHOSTAR TECHNOLOGIES CORPORATION, Englewood, CO (US)

(*) Notice: Subject to any disclaimer, the term of this patent is extended or adjusted under 35 U.S.C. 154(b) by 2328 days.

(21) Appl. No.: 11/965,281

(22) Filed: Dec. 27, 2007

(65) Prior Publication Data

US 2009/0167855 A1 Jul. 2, 2009

(51) Int. Cl.
| | |
|---|---|
| H04N 7/18 | (2006.01) |
| H04N 5/44 | (2011.01) |
| H04N 21/4147 | (2011.01) |
| H04N 21/422 | (2011.01) |
| H04N 21/443 | (2011.01) |
| G06F 15/16 | (2006.01) |

(52) U.S. Cl.
CPC ............... *H04N 5/4403* (2013.01); *H04N 7/18* (2013.01); *H04N 21/4147* (2013.01); *H04N 21/42204* (2013.01); *H04N 21/443* (2013.01); *H04N 21/4436* (2013.01)

(58) Field of Classification Search
USPC .................................. 348/114–119; 345/169
See application file for complete search history.

(56) References Cited

U.S. PATENT DOCUMENTS

| | | | |
|---|---|---|---|
| 6,160,989 A | 12/2000 | Hendricks et al. | |
| 7,745,743 B2* | 6/2010 | Liu ............................ | 200/5 R |
| 7,872,590 B2* | 1/2011 | Garrison ..................... | 340/4.3 |
| 2003/0229900 A1* | 12/2003 | Reisman ..................... | 725/87 |
| 2004/0066377 A1* | 4/2004 | Ha ............................. | 345/169 |
| 2005/0122438 A1 | 6/2005 | Sato | |
| 2006/0181429 A1* | 8/2006 | Garrison ................. | 340/825.69 |
| 2006/0271993 A1 | 11/2006 | Nakata et al. | |
| 2006/0279430 A1 | 12/2006 | Arai | |
| 2007/0046628 A1* | 3/2007 | Lee et al. ...................... | 345/156 |
| 2007/0102203 A1* | 5/2007 | Krzyzanowski et al. ..... | 178/101 |
| 2007/0185968 A1* | 8/2007 | White et al. .................. | 709/208 |
| 2008/0163301 A1* | 7/2008 | Park et al. ..................... | 725/46 |

FOREIGN PATENT DOCUMENTS

| | | |
|---|---|---|
| EP | 0999704 A | 5/2000 |
| EP | 1725026 A | 11/2006 |
| WO | 0193578 A | 12/2001 |

OTHER PUBLICATIONS

"How Harmony Works", excerpt from the Logitech internet site located at http://www.logitech.com/index.cfm/71/453&cl=us,en, retrieved on Mar. 20, 2008, 1 page.
"Consumer Product Line-R6", excerpt from the Universal Remote Control internet site located at http://www.universalremote.com/product_detail.php?model=127, retrieved on Mar. 20, 2008, 1 page.
"Philips Pronto Home Theater Control Panel—Pronto TSU9200", excerpt from the Philips internet site located at http://www.pronto.philips.com/library/documents/DataSheet_TSU9200_37.pdf, retrieved on Mar. 20, 2008, 2 pages.
European Search Report dated Apr. 3, 2009, EP 08172830.5, 10 pages.
European Office Action dated Aug. 5, 2009, 1 page.

* cited by examiner

*Primary Examiner* — Zarni Maung
(74) *Attorney, Agent, or Firm* — Seed IP Law Group PLLC

(57) ABSTRACT

An electronic system is presented which includes a remote control device and a first electronic device. In one embodiment, the remote control device is configured to accept a user input signifying a command for a second electronic device, as well as generate the command for the second electronic device, and an indication of the command. In another embodiment, the remote control device is configured to accept a user input that causes a mode change of the remote control device, wherein the mode identifies one of a plurality of electronic devices that receive commands from the remote control device. The remote control device is also configured to transmit the command to the second electronic device, if applicable, and transmit the indication of the command or mode change to the first electronic device. The first electronic device is configured to receive and process the indication to alter operation of the first electronic device.

11 Claims, 5 Drawing Sheets

ELECTRONIC SYSTEM INFORMING A FIRST ELECTRONIC DEVICE OF USER REMOTE CONTROL ACTIVITY INVOLVING A SECOND ELECTRONIC DEVICE

BACKGROUND

While entertainment-oriented electronic devices, such as television sets, audio amplifiers or receivers, compact disc (CD) and digital video disc (DVD) players, and cable and satellite television set-top boxes, have become increasingly advanced, possibly the most important function associated with such a device is also one of the most common: the ability to control the device remotely.

Typically, a remote control device is provided by the manufacturer of the particular electronic device to be controlled. Today, remote control devices employ infrared or ultra-high frequency (UHF) wireless signals to issue commands to the associated electronic device, typically employing a format of the manufacturer's choosing. As a result, a remote control designed for one electronic device typically is incapable of controlling another electronic device, especially one produced by a different manufacturer. Such a circumstance is often beneficial, however, as unintentional changes in the operation of one electronic device while controlling another is ordinarily undesirable. For example, intended modification of a selected channel of a satellite set-top box that also causes a channel change of a connected television set, or vice-versa, may make effective remote control of the two devices problematic, if not impossible.

Remote control device designs have evolved over the last few decades, providing greater control over the devices to the user. Furthermore, as the number of electronic devices that are controllable remotely has increased over time, remote control devices capable of controlling multiple components have become popular. Such capability is helpful in an environment such as a family room, which may contain a set-top box, television, DVD player, and the like. To this end, many such multi-component remote control devices include two or more buttons which the user may activate to set the "mode" of the remote control device. The mode determines which electronic device is to be controlled by subsequent button presses on the remote control device, such as the power button, the channel selection buttons, and the volume control buttons. Typically, one mode button is identified for each electronic device to be controlled, such as a cable or satellite broadcast set-top box, a television set, a video cassette recorder, an audio amplifier or receiver, or a CD or DVD player. Further, the remote control device allows the user to program one or more of the mode buttons to communicate with one of a variety of electronic devices from different manufacturers.

Generally, multi-component remote control devices only control one electronic device on the basis of the current mode setting of the remote control device. In some cases, however, a remote control device may be programmed to turn on or off multiple electronic devices with the pressing of a single button of the remote control device.

Even with remote control functionality, some electronic devices may perform various functions autonomously. For example, some satellite broadcast set-top boxes transition from an operational mode to a "standby" mode on its own, during which programming is unavailable to the television set connected with the set-top box. In some cases, standby mode is initiated after a predetermined period of time since the last user interaction with the set-top box, such as a change in channel selection or an access of a menu system. Standby mode typically involves powering down a resident hard drive and other circuitry to reduce power and wear of the set-top box. Also, housekeeping information, such as programming schedule updates and network status, may be downloaded to the set-top box during standby mode.

However, even if the user has not interacted with the satellite broadcast set-top box for an extended period of time, such as for a number of hours, the user may be accessing a music channel available via the set-top box through the majority of a day or evening to provide background music for a party or while performing household chores. In another instance, the user may be viewing a television series marathon, in which a number of episodes of a particular television show are presented in succession. In these and other cases, the user may be utilizing the set-top box without actively controlling the set-top box, either by way of a remote control device or directly through a user panel on the set-top box itself. Unfortunately, the set-top box may initiate standby mode under such circumstances, likely creating user frustration in the process.

DETAILED DESCRIPTION

Figure 1:
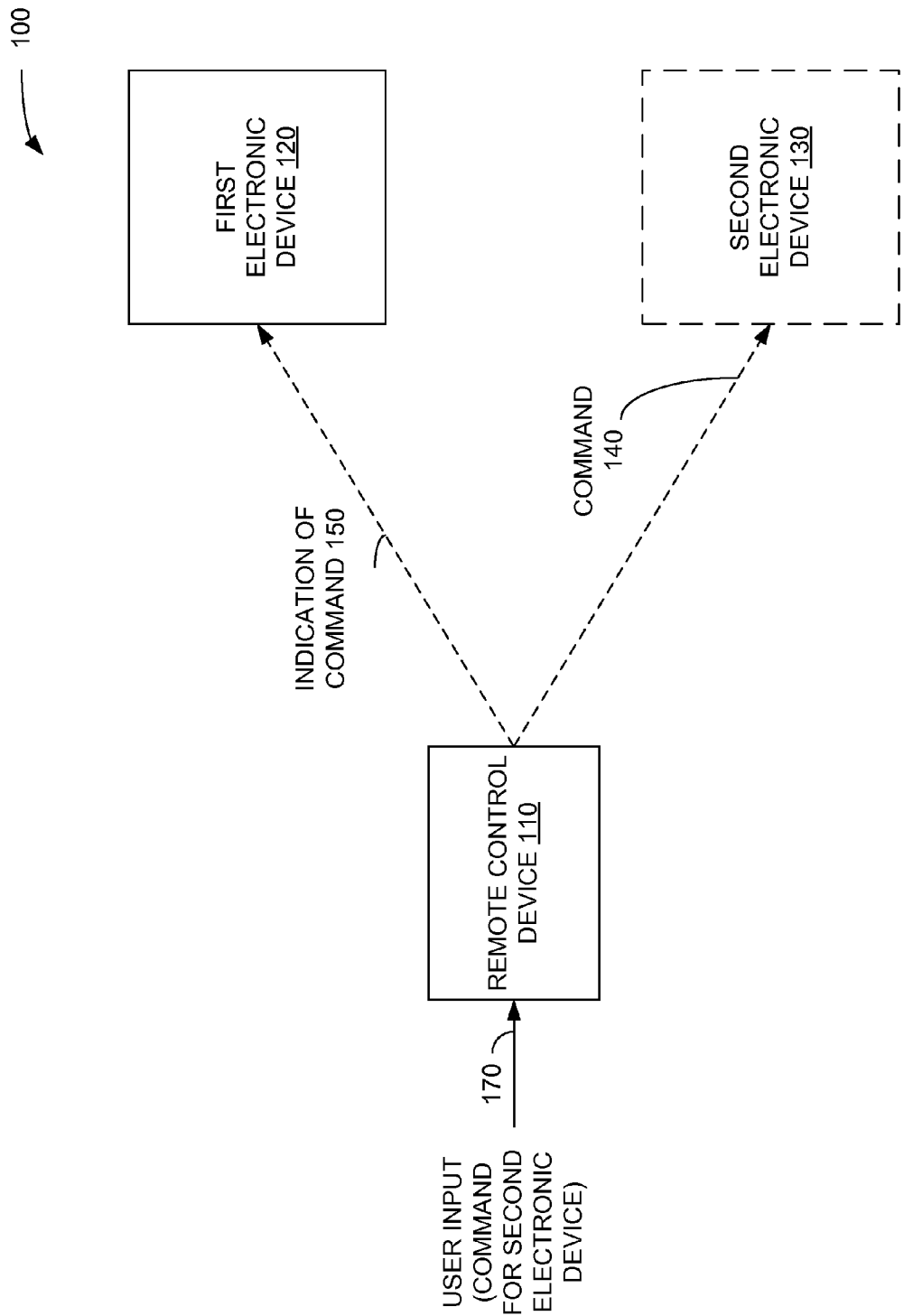
FIG. 1 is a block diagram of an electronic system including a remote control device and an associated electronic device according to an embodiment of the invention.
Figure 2:
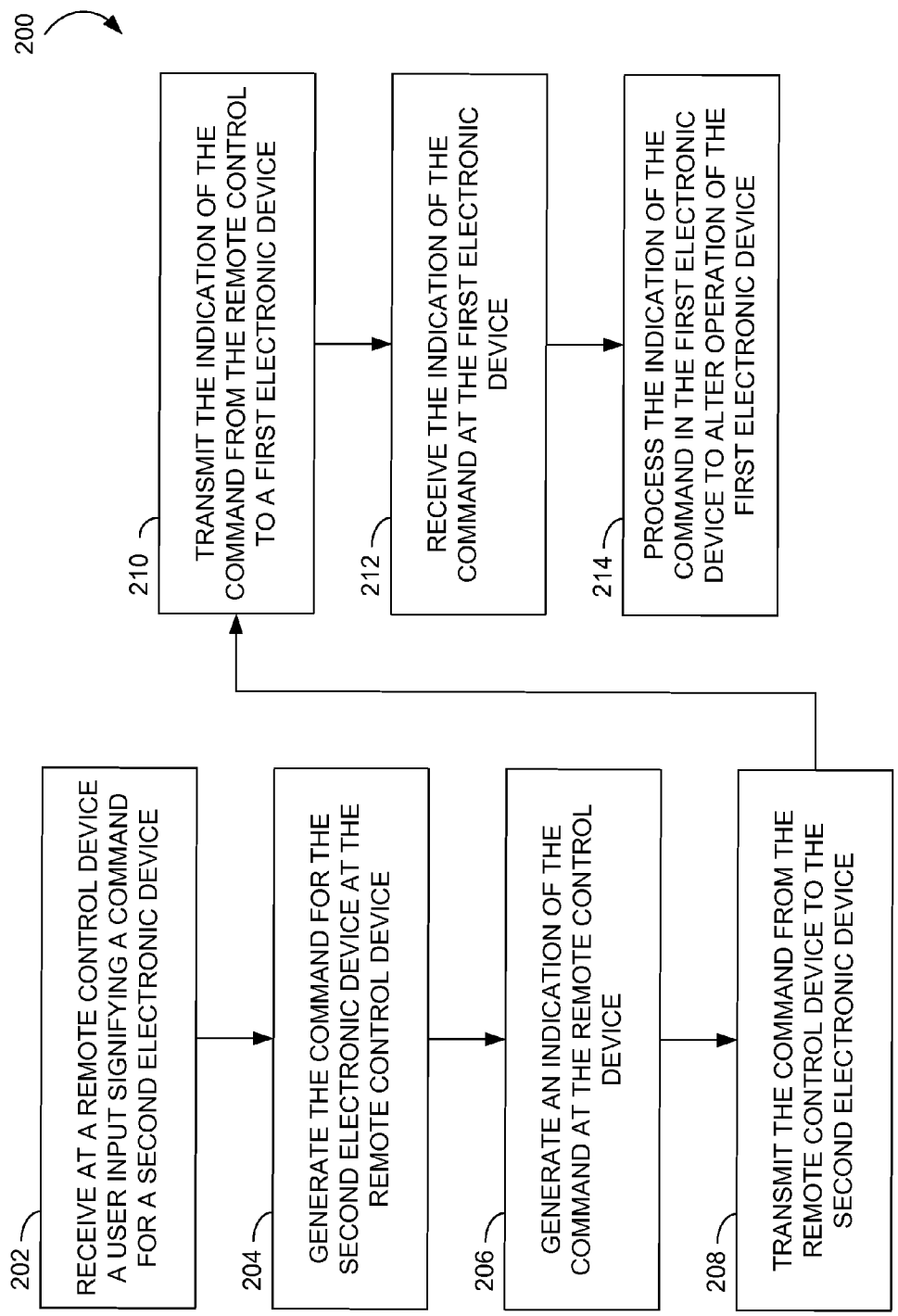
FIG. 2 is a flow diagram of a method according to an embodiment of the invention for informing a first electronic device concerning control of a second electronic device.

FIG. 1 presents a block diagram of an electronic system 100 including a remote control device 110 and a first electronic device 120. In one embodiment, the first electronic device 120 and a second electronic device 130 are configured to be controlled by the remote control device 110. In conjunction with FIG. 1, FIG. 2 provides a flow diagram describing a method 200 for informing the first electronic device 120 concerning control of the second electronic device 130. In the method 200, a user input 170 signifying a command 140 for the second electronic device 130 is received at the remote control device 110 (operation 202). The command 140 for the second electronic device 130 is generated in the remote control device 110 (operation 204). An indication 150 of the command 140 is also generated in the remote control device 110 (operation 206). The command 140 is transmitted from the remote control device 110 to the second electronic device 130 (operation 208), and the indication 150 of the command 140 is transmitted from the remote control device 110 to the first electronic device 120 (operation 210). The indication 150 of the command is received at the first electronic device 120 (operation 212) and processed therein to alter operation of the first electronic device 120 (operation 214).

Figure 3:
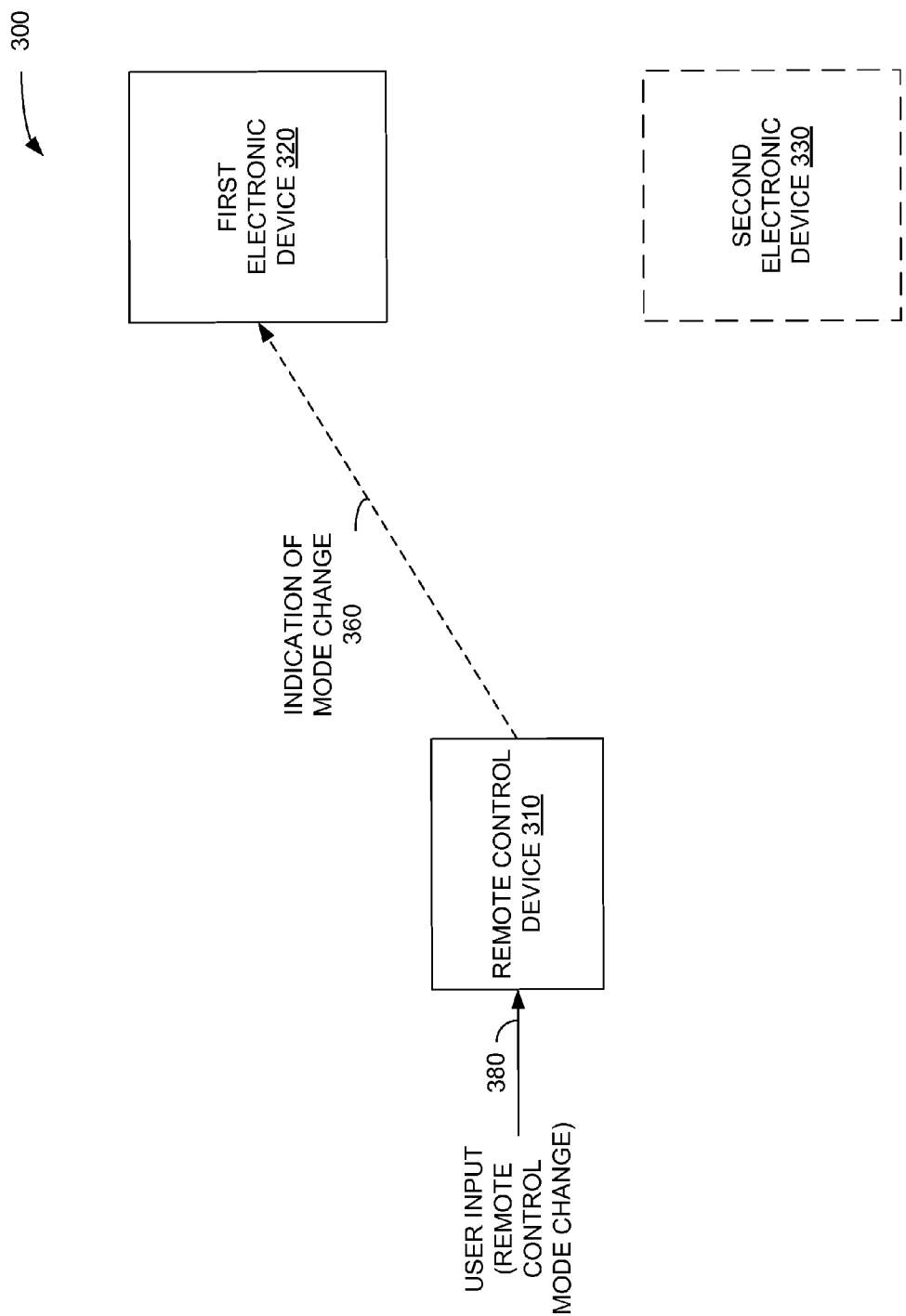
FIG. 3 is a block diagram of an electronic system including a remote control device and an associated electronic device according to another embodiment of the invention.
Figure 4:
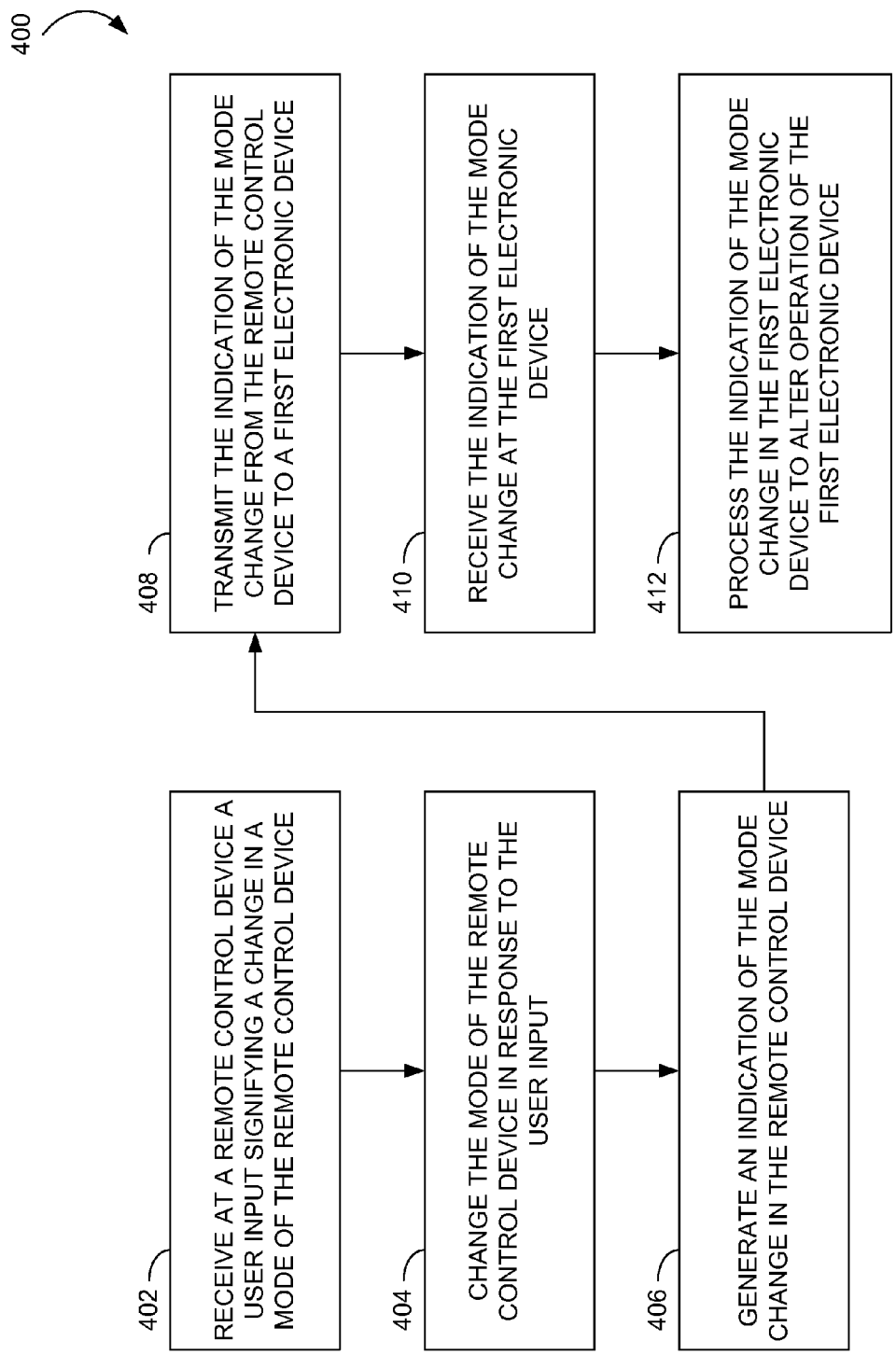
FIG. 4 is a flow diagram of a method according to an embodiment of the invention for informing an electronic device concerning activity of a remote control device.

In another embodiment, FIG. 3 depicts an electronic system 310 including a remote control device 310 and a first electronic device 320. In one embodiment, the first electronic device 320 and a second electronic device 330 are configured to be controlled by the remote control device 310. In conjunction with FIG. 3, FIG. 4 illustrates by way of flow diagram a method 400 for informing the first electronic device 320 concerning activity of the remote control device 310. In the method 400, a user input 380 signifying a change of a mode of the remote control device 310 is accepted at the remote control device 310 (operation 402). The mode identifies one of a plurality of electronic devices, such as the electronic devices 320, 330 of FIG. 3, for receiving commands from the remote control device 310. The mode of the remote control device 310 is changed in response to the user input 380 (operation 404). An indication 360 of the mode change is generated in the remote control device 310 (operation 406), which is then transmitted from the remote control device 310 to the first electronic device 320 (operation 408). The first electronic device 320 then receives the indication 360 of the mode change (operation 410), and processes the indication 360 to alter operation of the first electronic device 320 (operation 412).

Figure 5:
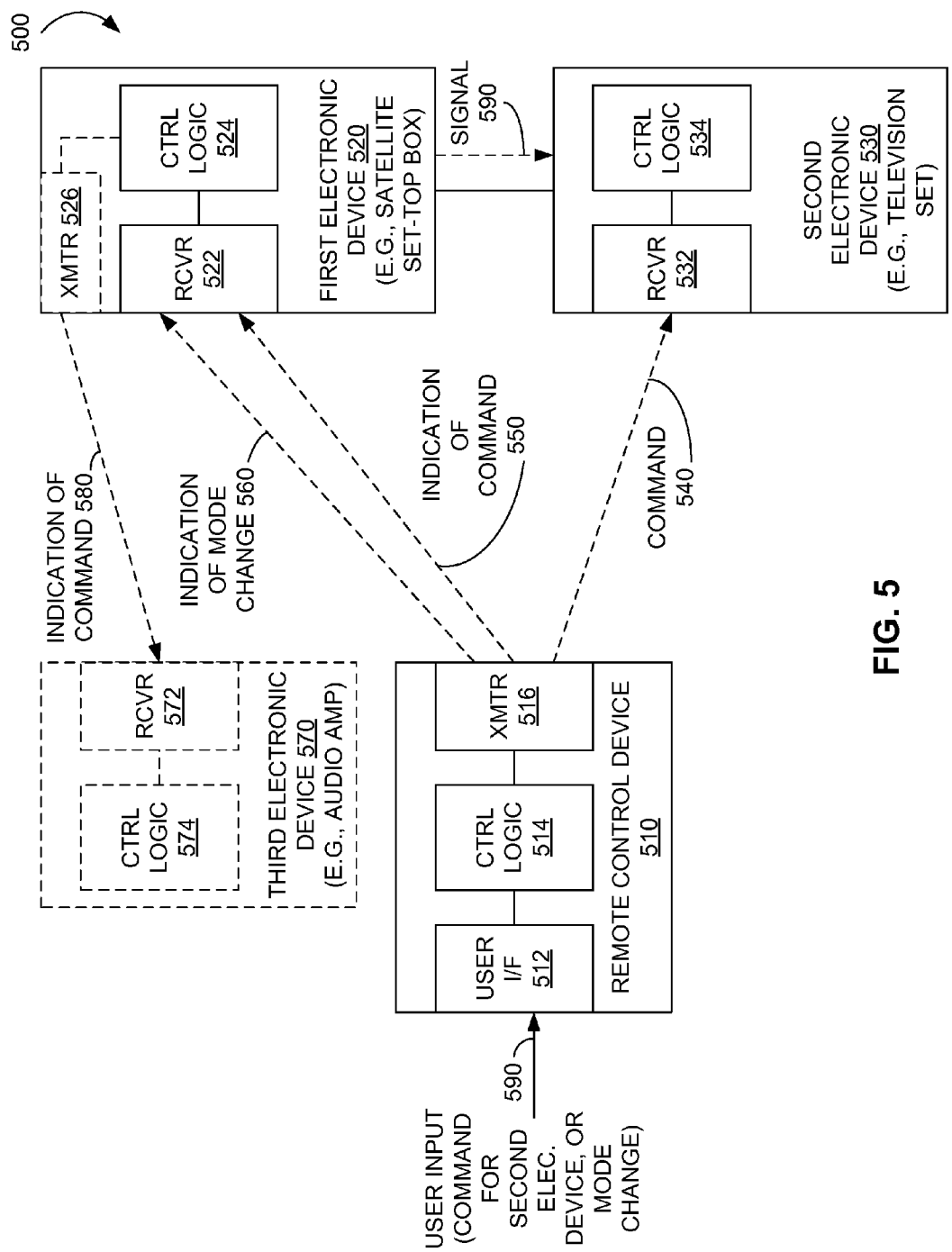
FIG. 5 is a block diagram of an electronic system including a remote control device and at least two associated electronic devices according to an embodiment of the invention.

FIG. 5 illustrates another embodiment of the invention: an electronic system 500 including a remote control device 510, a first electronic device 520, and a second electronic device 530. In this particular embodiment, the first electronic device 520 is a satellite set-top box 520, while the second electronic device 530 is a television set 530 in communication with the satellite set-top box 520. However, each of the electronic devices 520, 530 may be any device controlled by way of the remote control device 510, including, but not limited to, a cable set-top box, an over-the-air terrestrial broadcast set-top box, an audio amplifier or receiver, a video cassette recorder (VCR), a digital video recorder (DVR), a CD player, a DVD player, and a display device (such as a television set, a computer or video monitor, a projection display, or a flat panel display). Other embodiments may include more than the two electronic devices 520, 530 displayed in FIG. 5, such as the third electronic device 570 discussed in greater detail below.

Both the first electronic device 520 and the second electronic device 530 are configured to be controlled by the remote control device 510 under the guidance of a user. In one embodiment, the remote control device 510 utilizes an operation "mode" which determines which of the electronic devices 520 are to be controlled via the remote control device 510 at any particular time.

In the embodiment of FIG. 5, the remote control device 510 includes a user interface 512, control logic 514, and a transmitter 516. The user interface 512 is configured to accept user input 570 for a variety of reasons, including, but not limited to, controlling either or both of the electronic devices 520, 530, or changing the current mode of the remote control device 510. The user interface 510 may include any means employable by a user to provide input to the remote control device 510, such as pushbuttons, switches, touch pads, joysticks, and the like. Also, the user interface 512 may further include lamps, light-emitting diodes (LEDs), and other components for providing informational feedback to the user.

The user interface 512 is configured to receive user input 570 signifying commands for either the satellite set-top box 520 or the television set 530. Such commands may include, but are not limited to, turning the particular electronic device 520, 530 on or off, selecting a particular broadcast channel on the device 520, 530, modifying a volume or audio level output of the device 520, 530, and accessing a menu provided by the device 520, 530. The user may input such commands by way of numeric pushbuttons, directional (e.g., up or down) pushbuttons, or any of the other means mentioned above.

To specify which electronic device 520, 530 is to receive commands from the remote control device 510, the user interface 512 may provide a means to allow the user to signify the mode in which the remote control device 510 operates. As mentioned above, the mode determines to which of the electronic devices 520, 530 subsequent commands are to be directed. For example, while in "satellite set-top box" mode, commands input by the user by way of the user interface 512 are formatted for and transmitted to the satellite set-top box 520. Similarly, while in "television set" mode, the commands input via the user interface 512 are formatted for and transferred to the television set 530. In one embodiment, setting the mode may merely involve pressing a particular button of the user interface 520 specifically identified with the desired mode.

Presuming the remote control device 510 is in television mode while the user inputs a command 540 at the user interface 512, the control logic 514 of the remote control device 510 is configured to generate the command 540 for use by the television set 520. The command 540 generated by the control logic 514 is in a form that is understandable by the television set 520. In one embodiment, the command 540 is represented by a series of binary digits (bits) which identify the command, indicate the intended electronic device to be controlled, and provide a number of redundancy bits for error detection and/or correction purposes.

The control logic 514 is also configured to generate an indication 550 of the command 540 for use by the satellite set-top box 520 in order to inform the set-top box 520 of the user activity in controlling the television set 530. In one embodiment, this indication 550 is generated in the form of a code or other format understandable by the set-top box 520.

The transmitter 516 of the remote control device 510 is configured to transmit the command 540 by employing a technology and format acceptable to the television set 530. For example, the transmitter 516 may be an infrared transmitter commonly employed in remote control units. In other embodiments, the transmitter 516 may employ other wireless communication technologies, such as UHF or ultrasonic transmissions. Similarly, the transmitter 516 is configured to transmit the indication 550 of the command 540 to the satellite set-top box 520. In one embodiment, the indication 550 of the command 540 is appended to the end of the command 540 itself. Such an embodiment is possible if the communication technology employed by the set-top box 520 and the television set 530 are the same, such as infrared technology. In another implementation, the set-top box 520 may employ a different communication form, such as UHF. In that case, the transmitter 516 of the remote control device 510 may actual include two separate transmitters: a UHF transmitter for communicating with the set-top box 520, and an infrared transmitter for communicating with the television set 530. Other combinations of transmitters for the remote control device 510 are possible in other embodiments.

The set-top box 520 includes a receiver 522 compatible with the transmitter 516 of the remote control device 510 for receiving the commands 540. The receiver 522 also is configured to receive the indication 550 of the command 540 as described above. Similarly, the television set 530 includes its own receiver 532 for receiving commands 540 as well. Each of the receivers 522, 524 may be an infrared receiver, a UHF receiver, an ultrasonic receiver, or any other receiver compatible with the particular communication technology utilized by the transmitter 516 of the remote control device 510.

The television set 530 also includes control logic 534 configured to process the command 540 received from the remote control device 510 in order to modify the operation of the television set 520 according to the command 540. Similarly, control logic 524 within the set-top box 520 processes commands it receives from the remote control device 510 in order to execute those commands. In addition, the control logic 524 within the set-top box 520 processes the indication 550 of the command 540 described above to alter the operation of the set-top box 520, even though the set-top box 520 neither receives nor executes the command 540 itself.

In one embodiment, the set-top box 520, upon receiving the indication 550, may terminate a standby mode within the set-top box 520. As discussed earlier, standby mode may be invoked within the set-top box 520 at certain times of day or after a predetermined time of user inactivity, and is used to update programming information from a satellite, conserve power and wear of various components of the set-top box 520, and the like. In another example, presuming a timer (not shown in FIG. 5) is employed within the set-top box 520 to determine when standby mode should be invoked, the set-top box 520 may alter the value of the timer to postpone standby mode.

One advantage of employing the indication 550 of a command 540 to be executed by the television set 530 is that the satellite set-top box 520 is notified of user activity regarding the television set 530, even though the user has not interacted with the set-top box 520. For example, the user may be periodically raising or lowering the volume level of the television set 530 without interacting with the set-top box 520. As a result, initiation of standby mode in the set-top box 520 while the user is still actively watching or listening to programming from the set-top box 520 via the television set 530 may be avoided.

Depending on the embodiment, the commands 540 intended for the television 530 may be mapped to one or more indications 550. For example, all of the commands 540 that may be transmitted from the remote control device 510 to the television set 530 may be associated with a single digital code for the indication 550. In that case, the satellite set-top box 520 will not be able to ascertain which specific command 540 was issued to the television set 530. In another embodiment, each command 540 may be associated with a distinct code for the indication 550, thus allowing the set-top box 520 to determine exactly which command 540 was transmitted to the television set 530.

In another embodiment, a code for an indication 550 associated with an on or off command 540 may be unique from any other codes implemented so that the set-top box 520 is aware of that particular command. In that event, the set-top box 520 may present a "welcome screen" for display on the television set 530. The welcome screen may present information of interest to a user that has just powered on the television set 530. For example, the welcome screen may list programs of potential interest that are being aired that night, recent changes to the programming schedule, new programming available on a pay-per-view basis, and so on. In another embodiment, the set-top box 520 may provide a "welcome channel" for display to the television set 530. Such a channel may include the information discussed in relation to the welcome screen, plus provide previews and other relevant programming information. The welcome channel may also include various graphics and text providing information relating to various aspects of the satellite communication system.

Presuming other components, such as an audio amplifier or a DVD player, are configured to be controlled by the remote control device 510, indications 550 associated with each command transmitted from the remote control device 510 to those components may be sent to the set-top box 520 to inform the set-top box 520 of any user activity related to the operation of any of these components.

In another embodiment, the set-top box 520 may be informed of user activity in operating the remote control device 510 even when no commands are issued to the television set 520 or other electronic device. For example, when the user signifies a mode change through the user interface 512 of the remote control device 510 to switch devices to be controlled, the control logic 514 may generate an indication 560 of the mode change. The transmitter 516 may then transmit the indication 560 of the mode change to the set-top box 520, wherein the indication 560 is received at the set-top box receiver 522, and then processed by the associated control logic 524 to alter the operation of the set-top box 520, as described above. Thus, in this particular embodiment, even though no commands 540 are transmitted from the remote control 510, the interaction between the user and the remote control device 510 provides the impetus for issuing an indication 560 of that activity to the set-top box 520. In other embodiments, other interactions between the user and the user interface 512 of the remote control device 510 that do not result in a command 540 being transmitted may instigate the generation and transmission of an indication to the set-top box 520 to indicate the presence of the user.

In another embodiment, a signal 590 associated with the indication 550, 560 received by the set-top box 520 may be transmitted to the television set 530 for display to the user. In one example, if the set-top box 520 receives an indication 560 associated with a mode change in the remote control device 510, the set-top box 520 may transfer the signal 590 to the television set 530 to alert the user of the mode change. In one embodiment, the signal 590 takes the form of text or graphics displayed on the television set 530 that are indicative of the mode change. Such information may be valuable to a user who has inadvertently changed the mode of the remote control device 510 and is subsequently confused as to why user input to the remote control device 510 no longer results in commands being issued to the desired electronic device. In other embodiments, other indications 550, 560 received at the set-top box 520 as a result of user activity involving the user interface 512 of the remote control device 510, or transmissions of commands 540 from the remote control device 510, may cause the set-top box 520 to issue a signal 590 associated with the particular indication 550, 560 to the television set 530.

In another embodiment, the set-top box 520 may include its own transmitter 526 for providing an indication 580 of the command 540 to a third electronic device 570. In turn, the third electronic device 570 may then receive the indication 580 of the command 540 by way of a receiver 572 compatible with the transmitter 526 of the set-top box 520 and, in response, employ control logic 574 to alter its own operation. For example, presuming the third electronic device 570 is an audio amplifier coupled with either the set-top box 520 or the television set 530, and the command 540 from the remote control device 510 is a command to increase audio volume, the set-top box 520 may transmit an indication 580 of the command 540 to the audio amplifier 570 in response to receiving the command indication 550 from the remote control device 510. In response to receiving its command indication 580, the audio amplifier 570 may increase its volume in response. As a result, the user need not change the mode of the remote control device 510 to specifically communicate with the audio amplifier 570, or employ a separate remote control for the audio amplifier 570, in order to cause an increase in volume of the amplifier 570. As before, the transmitter 526 of the set-top box 520 and the receiver 572 of the audio amplifier 570 may employ any wired or wireless communication technology, such as infrared, ultrasonic, or UHF technologies.

Each of the control logic components 514, 524, 534 shown in FIG. 5 may be any electronic hardware, software, or combination, such as an application-specific IC, or a microprocessor, microcontroller or digital signal processor (DSP) with firmware. Further, the control logic components 514, 524, 534 may control many other aspects of the remote control device 510, the set-top box 520, and the television set 530 not discussed herein.

While several embodiments of the invention have been discussed herein, other embodiments encompassed by the scope of the invention are possible. For example, while embodiments of the invention have been described specifically in connection with a satellite broadcast set-top box, such as that normally associated with video and audio programming, other electronic devices, such as cable television set-top boxes, CD and DVD players, audio receivers and amplifiers, and other electronic devices, may benefit from application of the concepts described herein. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. An electronic system, comprising:
   a remote control device and a first electronic device;
   wherein the remote control device is configured to accept a user input which causes a change in a mode of the remote control device, generate an indication of the mode change, and transmit the indication of the mode change to the first electronic device; wherein the mode identifies one of a plurality of electronic devices other than the first electronic device for receiving commands from the remote control device; and
   wherein the first electronic device is configured to receive the indication of the mode change and process the indication of the mode change to alter operation of the first electronic device.

2. The electronic system of claim 1, wherein:
   the first electronic device comprises one of a satellite broadcast receiver, a cable broadcast receiver, and an over-the-air terrestrial broadcast receiver; and
   the plurality of electronic devices comprises at least a display device in communication with the first electronic device.

3. The electronic system of claim 1, wherein the first electronic device is configured to process the indication of the mode change to transmit a signal associated with the indication of the mode change to one of the second electronic devices for display.

4. The electronic system of claim 1, wherein the plurality of electronic devices comprises at least one of a video cassette recorder, a digital video recorder, a compact disc player, a digital video disc player, and an audio amplifier.

5. The electronic system of claim 1, wherein the first electronic device is configured to alter the operation of the first electronic device by presenting programming-related information for display on one of the second electronic devices.

6. The electronic system of claim 5, wherein the programming-related information is presented as at least one of a static video screen and a video channel.

7. The electronic system of claim 1, wherein the first electronic device is configured to alter the operation of the first electronic device by terminating or postponing a standby mode of the first electronic device.

8. The electronic system of claim 1, wherein the remote control device transmits the indication of the mode change by way of at least one of an ultra-high frequency signal, an infrared signal, and an ultrasonic signal.

9. A method for informing a first electronic device concerning activity of a remote control device, the method comprising:
   accepting a user input signifying a change of a mode of the remote control device at the remote control device, wherein the mode identifies one of a plurality of electronic devices other than the first electronic device for receiving commands from the remote control device;
   changing the mode of the remote control device in response to the user input;
   generating an indication of the mode change in the remote control device;
   transmitting the indication of the mode change from the remote control device to the first electronic device;
   receiving the indication of the mode change at the first electronic device; and
   processing the indication of the mode change in the first electronic device to alter operation of the first electronic device.

10. The method of claim 9, further comprising transmitting a signal associated with the indication of the mode change from the first electronic device to one of the second electronic devices for display.

11. The method of claim 9, wherein altering the operation of the first electronic device comprises terminating or postponing a standby mode of the first electronic device.

* * * * *